(12) United States Patent
Notter

(10) Patent No.: US 8,900,494 B2
(45) Date of Patent: Dec. 2, 2014

(54) SAFETY AND CLAMPING DEVICE FOR AN APPARATUS FOR FABRICATING PARTS

(71) Applicant: David A. Notter, Lake in the Hills, IL (US)

(72) Inventor: David A. Notter, Lake in the Hills, IL (US)

(73) Assignee: Aktiebolaget SKF, Gothenburg (SE)

( * ) Notice: Subject to any disclaimer, the term of this patent is extended or adjusted under 35 U.S.C. 154(b) by 172 days.

(21) Appl. No.: 13/713,108

(22) Filed: Dec. 13, 2012

(65) Prior Publication Data

US 2014/0167323 A1   Jun. 19, 2014

(51) Int. Cl.
*B29C 33/30* (2006.01)
*B29C 45/64* (2006.01)
*B29C 37/00* (2006.01)

(52) U.S. Cl.
CPC ............ *B29C 45/641* (2013.01); *B29C 33/30* (2013.01); *B29C 2037/94* (2013.01)
USPC ........ 264/40.1; 264/328.1; 425/151; 425/153

(58) Field of Classification Search
CPC .... B29C 33/30; B29C 2037/94; B29C 45/84; B29C 45/641; B29C 45/1742; B29C 45/1744
USPC ............... 264/40.1, 328.1; 425/136, 151, 153
See application file for complete search history.

(56) References Cited

U.S. PATENT DOCUMENTS

| | | | | |
|---|---|---|---|---|
| 5,785,908 A | * | 7/1998 | Bott et al. | 264/40.5 |
| 6,287,104 B1 | * | 9/2001 | Hehl | 425/136 |
| 7,179,074 B2 | * | 2/2007 | Zellerohr et al. | 425/151 |

* cited by examiner

*Primary Examiner* — Jill Heitbrink
(74) *Attorney, Agent, or Firm* — Mark Ussai; SKF USA Inc. Patent Department

(57) ABSTRACT

An apparatus of the present invention presents a housing for engaging a mold device that includes a top plate having a top mold and a bottom plate having a bottom mold. The top plate presents side edges presenting a plurality of male elements extending therefrom. A top portion of the housing presents a safety and locking device (the device) to secure the top plate. The device presents several plates movable relative one another to secure the top plate. In case of a power outage, an actuator cooperably connected with the device prevents a shaft, connected to one of the plates, to move back to its idle position thereby locking the top plate within the device to prevent disengagement of the top plate from the device.

35 Claims, 5 Drawing Sheets

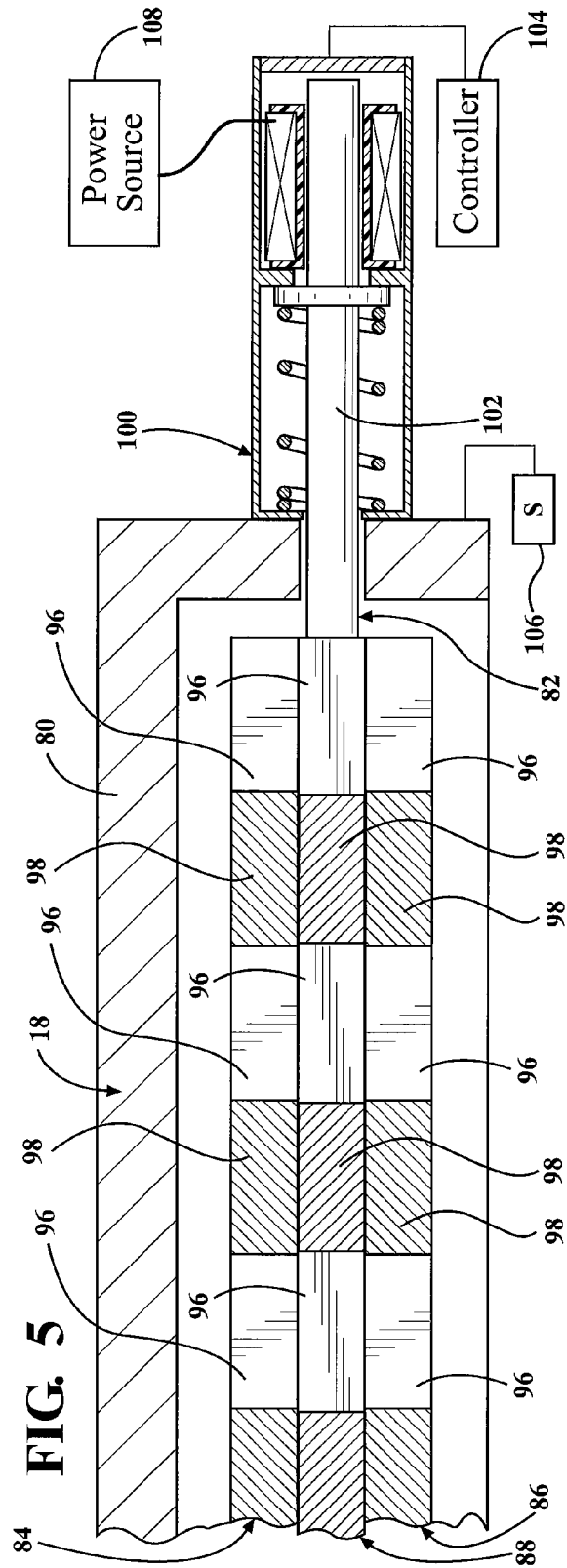
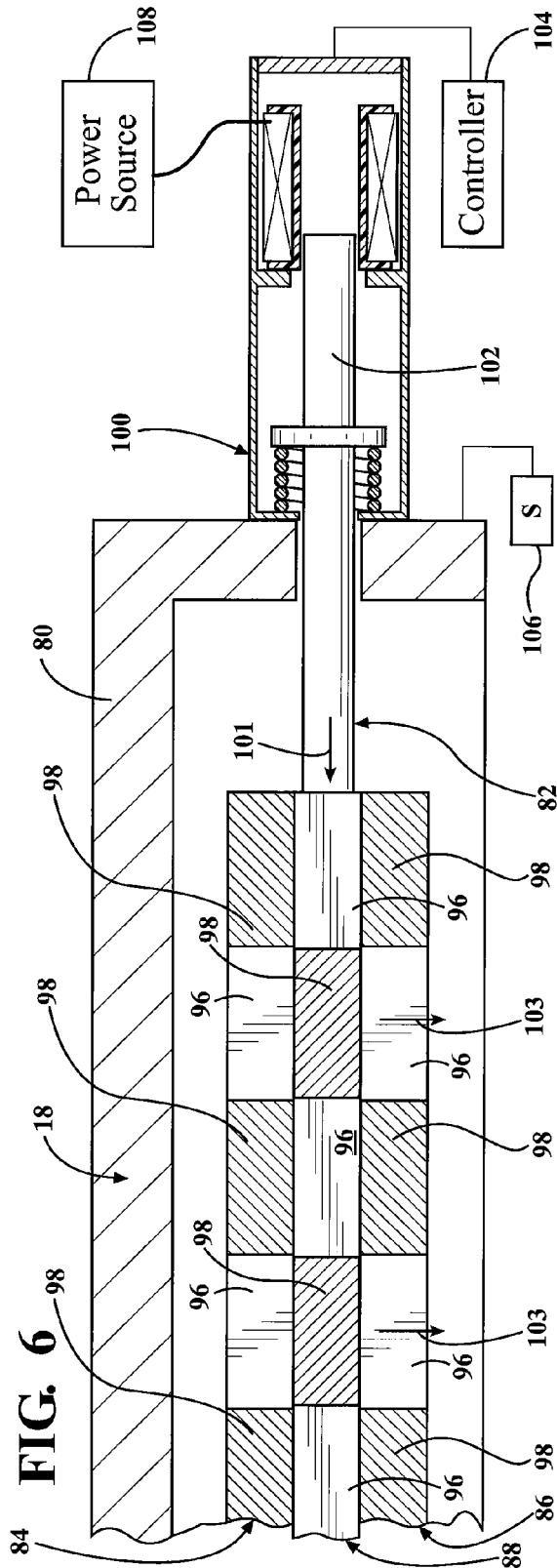

SAFETY AND CLAMPING DEVICE FOR AN APPARATUS FOR FABRICATING PARTS

FIELD OF THE INVENTION

The present invention relates to molding machines, particularly to a safety unit installed in the molding machine.

BACKGROUND OF THE INVENTION

Injection molding is a manufacturing process for producing parts from both thermoplastic and thermosetting plastic materials. Injection molding machines include at least two mold mounting plates, with one mold mounting plate fixedly anchored upon a machine bed and with the other mold mounting plate movable relative thereto. The mold mounting plates carry respective half-molds, i.e. an upper mold and a bottom mold. Opening and closing of the cavity involves a displacement of the moving mold mounting plate or an upper mounting plate relative to the fixed mold mounting plate, i.e. a bottom mounting plate controlled by a mold closing unit. Material, such as thermoplastic or thermosetting plastic materials, is fed into a heated barrel, mixed, and forced into the mold cavity defined by the upper and bottom molds, where it cools and hardens to the configuration of the mold cavity in order to transform to a desired part or a product. Injection molding is widely used for manufacturing a variety of parts, from the smallest component to entire body panels of cars, and other parts.

The art of molding machines used in injection molding operations is replete with various designs with various mold closing units, some of them include a toothed locking bar attached to a movable mold mounting plate and penetrating the opposite facing stationary mold mounting plate through an opening. A control element is disposed at the opening for controlling the engagement of a pawl with the toothed locking bar wherein the pawl is movable into and out of engagement with the notches of the locking bar. The control element is activated by the positioning signals of a switch, which is actuated by the protective door when the protective door has reached open position. This type safety device requires relatively high expenditures with respect to mechanics and maintenance and in addition, the device itself also impedes accessibility to the space between the two mold mounting plates. Safety of the molding machines play a very important role during operation of the molding machine in order to minimize work related injuries on manufacturing floor.

One of such devices is taught by U.S. Pat. No. 7,179,074 to Zellerohr et al., which teaches two mold halves mounted to one of the two mold mounting plates. Attached to the movable mold mounting plate is a locking bar, which is provided with toothed notches and projects through an opening into the stationary mold mounting plate. A control member is secured to the stationary mold mounting plate, and operatively connected to a pawl, which can be brought into and out of engagement with the toothed notches of the locking bar for a locking, respectively an unlocking position. The locking bar and opening are disposed outside the mounting area of the mold halves and in the marginal area of the mold mounting plates. The device taught by the U.S. Pat. No. 7,179,074 to Zellerohr et al., is very complex and bulky and does not provide an alternative design that is compact and can serve several purposes such as clamping the upper mold to the housing and secure the upper mold in place in case of power outage and any external or internal impacts on the housing where the mold halves are positioned that may cause shutting or inadvertent drop of the upper mold against the bottom mold.

Another design is taught by U.S. Pat. No. 4,029,457 to Yamamoto, which discloses a molding machine of the type where a movable die plate carrying a movable mold is moved toward a stationary mold. The movable die plate is locked, by a locking member, to the tie bars. Then the mold-tightening cylinder is operated to strongly urge the movable mold against the stationary mold. The locking member is operated by an electric actuator before the movable mold engages the stationary mold, or while the movable die plate is still being moved toward the stationary mold. Similar to the device taught by the U.S. Pat. No. 7,179,074 to Zellerohr et al., the molding machine taught by the U.S. Pat. No. 4,029,457 to Yamamoto is very complex and bulky and does not provide an alternative design that is compact and can serve several purposes such as clamping the upper mold to the housing and secure the upper mold in place in case of power outage and any external or internal impacts on the housing where the mold halves are positioned that may cause shutting or inadvertent drop of the upper mold against the bottom mold.

Still another apparatus is taught by U.S. Pat. No. 5,211,970 to Sakurai et al., which discloses a hydraulic clamping apparatus for use with injection molding machines. The clamping apparatus includes a first hydraulic actuator having a first cylinder and a first hollow, cup-shaped piston with a closed head portion disposed for reciprocating movement within the first cylinder, a foot portion axially spaced from the head portion and defining an opening, a second hydraulic actuator having a second piston, a rod extending axially through the opening into the first piston and connected between the first and second pistons, a second cylinder mounted for reciprocating movement on the second piston and through the opening between a recessed position substantially within the first piston and an extended position substantially outside the first piston, and a clutch operable in the extended position of the second cylinder to produce engagement thereof with the first piston. The overall length of the apparatus is minimized by placement of the second actuator cylinder within the first piston.

U.S. Pat. No. 6,533,573 to Tamaki et al, discloses a mold clamping apparatus for an injection molding machine includes a stationary platen fixedly holding the stationary mold, a movable platen fixedly holding the movable mold and disposed opposite to the stationary platen, tie bars for guiding the movable platen for movement toward and away from the stationary platen, a movable platen driving mechanism for moving the movable platen along the tie bars to close and open the mold, a movable platen fixing mechanism for fixing the movable platen to the tie bars at a set position immediately before a position where the movable mold is joined to the stationary mold, and a clamping force applying mechanism including sealed hydraulic cylinder actuators capable of converting energy of a hydraulic fluid into an intensified mold clamping force and of applying the intensified mold clamping force to the stationary platen. In one embodiment, a rear plate located behind the movable platen carries a hydraulically driven ram support and clamping ram, and the ram support has a piston portion that is carried in a cylinder bore in the rear plate. The ram hydraulically clamps the mold closed after the movable platen is electrically driven to bring the mold halves together. The mold clamping apparatus taught by the U.S. Pat. No. 6,533,573 to Tamaki et al., for example, is very complex and bulky and does not provide an alternative design that is compact and can serve several purposes such as clamping the upper mold to the housing and secure the upper mold in place in case of power outage and any external or internal impacts on the housing where the mold halves are positioned that may cause shutting or inadvertent drop of the upper mold against the bottom mold.

Therefore, an opportunity exists for an improved molding apparatus for holding a mold assembly including upper and bottom mold portions that is simple in production and installation, and service and can serve several purposes such as clamping of the upper mold portion to the housing and secure the upper mold portion in place in case of power outage and any external or internal impacts on the housing thereby preventing shutting down or inadvertent drop of the upper mold portion against the bottom mold portion to eliminate any accident and injuries in a working environment during production process.

In addition, it would therefore be desirable and advantageous to provide an improved device for securing the upper mold portion of the injection molding machine by simple means, which obviates prior art shortcomings by preventing an inadvertent closing of the upper mold portion and to thereby realize improved security of operation as well as retaining good accessibility between the two mold mounting plates.

SUMMARY OF THE INVENTION

A present invention relates to a mold apparatus (the apparatus) used for fabricating parts made from rubber, plastics, metal and metal alloys through injection molding. The apparatus receives a mold device that includes a first mold part or half and a second mold part or half operably connected with one another to define a cavity therebetween to receive at least one of polymeric, non-polymeric materials for forming parts. Alternatively, the apparatus is also configured to perform stamping operations wherein blanks of at least one of metallic and organic materials (not shown) are placed between the first mold part and the second mold part thereby stamping parts (not shown). The apparatus may also be used for compression and transfer molding operations as well. The apparatus of the present invention presents a housing or a camera for engaging the mold device that includes a top plate or platen with a top mold (the first mold) connected to and extending therefrom and a bottom plate with a bottom mold (the first mold) connected to and extending therefrom. Each of the top and bottom mold includes a cavity formed therein to adapt to a form of a part to be either stamped or molded. The top plate presents side edges with at least two of the side edges presenting a plurality of male elements or teeth extending therefrom in a cantilevered fashion. The bottom plate includes a lip portion extending from at least two sides of the bottom plate. A base plate, located on the bottom of the housing, is used to receive the bottom plate wherein the lip portions of the bottom plate slide into grooves extending from the base plate thereby allowing the bottom plate to slide to and away from the grooves.

A plurality of ports are defined in the base plate to receive supply of air or other fluids to facilitate operational mode of the bottom mold or act as ports to supply plastic if the bottom and top molds are used for injection molding operations. A top portion of the housing presents a safety and locking device to secure the top plate. The locking and safety device presents several plates, i.e. a top teethed slide, a bottom teethed slide, and a center slide movable (slidable) relative to the top teethed slide and the bottom teethed slide to secure the top plate.

Alluding to the above, a shaft extending from an actuator, is connected to the center slide to move the center slide relative the top teethed slide and the bottom teethed slide to secure the top plate. The top plate includes teethed edges to be engaged by the teethed slides of the locking and safety device. As the center slide moves, the teeth of the center slide fill in the gaps between the teeth of the top mold thereby keeping the top mold plate within the locking and safety device. In case power outage, the power source will stop providing power to the actuator to prevent the actuator from springing the shaft back to its idle position thereby locking the top plate within the locking device.

An advantage of the present invention is to provide the improved apparatus and method for quick release of the molds and replacement of the molds thereby saving time during manufacturing of the parts of different configurations wherein the molds can be replaced within several minutes as compared to some prior art mold devices wherein it may take up to several hours in order to replace the molds.

Another advantage of the present invention is to provide the improved molding apparatus and method for securing the first or upper mold plate of the injection molding machine against inadvertent closing of the two molds relative to one another or dropping of the first mold in case of power outage or other mechanical or electrical malfunctions of the apparatus.

Still another advantage of the present invention is to provide the improved apparatus and method for holding a mold assembly including first and second mold portions that is simple in production, installation, and service and can serve several purposes such as clamping of the upper mold to the housing and secure the upper mold in place in case of power lose and any external or internal impacts on the housing to prevent shutting or inadvertent drop of the upper mold against the bottom mold to eliminate any accident and injuries in a working environment during production process.

Still another advantage of the present invention is to provide the improved apparatus and method for securing the upper mold of the injection molding machine by simple means, which obviates prior art shortcomings by preventing an inadvertent closing of the upper mold and to thereby realize improved security of operation as well as retaining good accessibility between the two mold mounting plates.

Still another advantage of the present invention is to provide the improved apparatus for forming parts that is compact in design and can be utilized in various industrial applications.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 5 and 6 illustrate partial cross sectional view of the top portion of the housing with the safety device shown in idle position as all three plates are aligned with one another, as shown in FIG. 5, and activated position wherein one of the plates is displaced to engage the plurality of male elements or teeth of the top plate thereby locking the top plate with the safety device.

DESCRIPTION OF THE INVENTION

Figure 1:
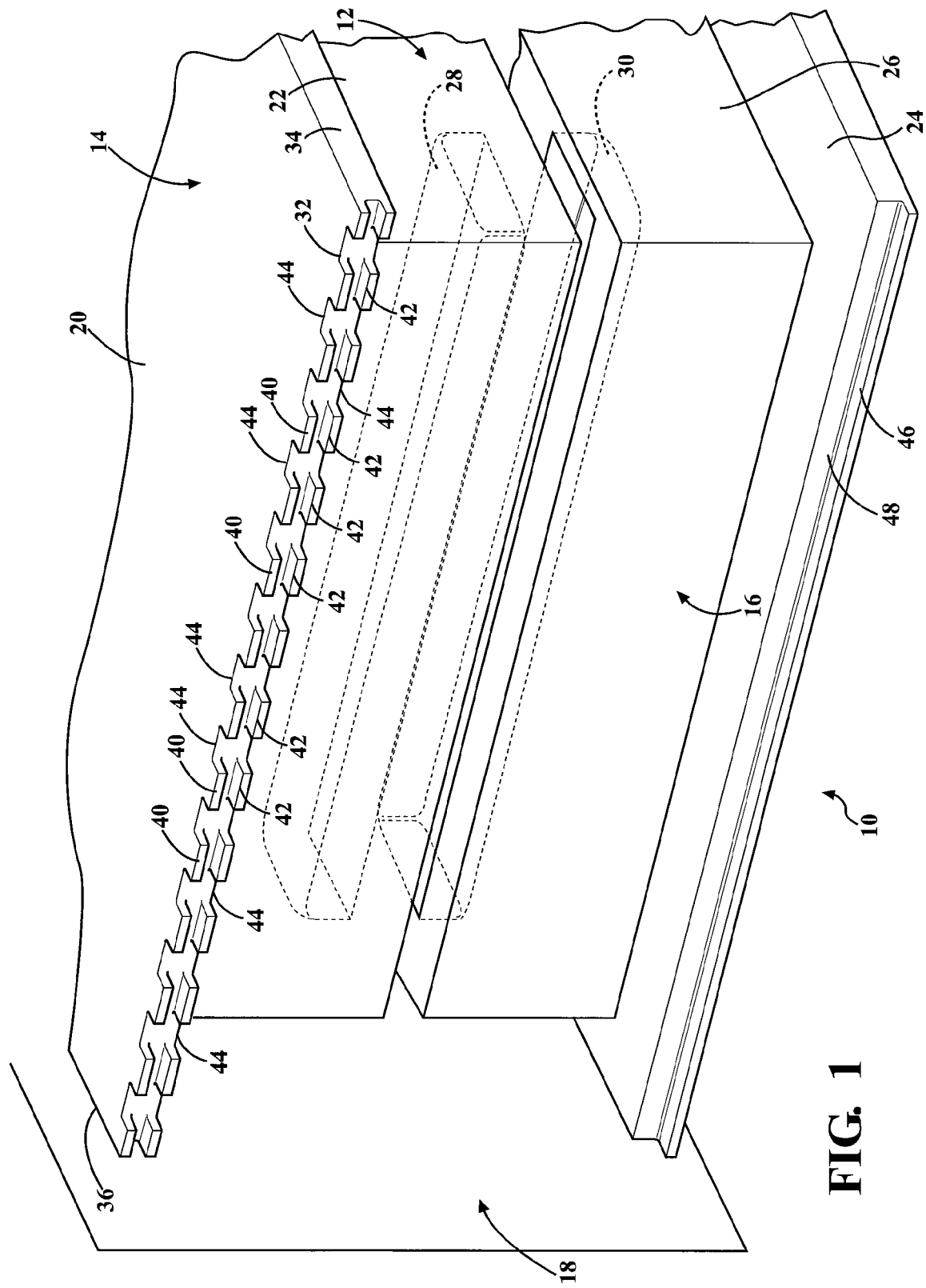
FIG. 1 illustrates perspective and exploded view of a mold apparatus of the present invention having a top plate and a top mold connected to and extending from the top plate and a bottom plate with a bottom plate connected to and extending from the bottom plate for fabricating parts with the mold apparatus adaptable for forming parts through injecting molding or stamping operations.
Figure 2:
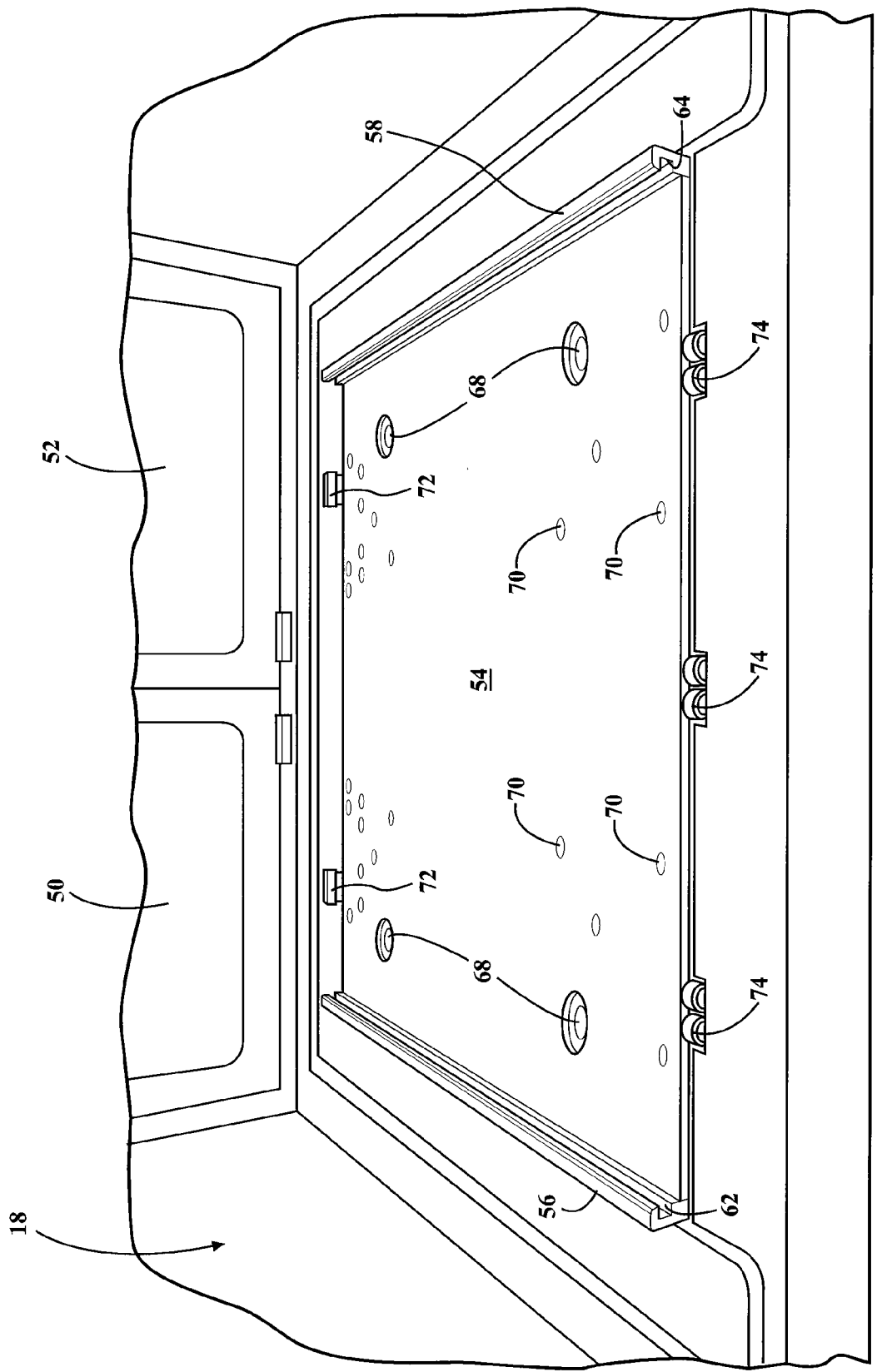
FIG. 2 illustrates partial and perspective view of a housing with a support or base surface for aligning and engaging the bottom plate of the mold apparatus.

Referring to FIGS. 1 through 7, wherein like numerals indicate like or corresponding parts throughout the several views, a molding apparatus (the apparatus), generally shown at 10 in FIGS. 1 and 3 through 7, is used for fabricating parts made from rubber, plastics, metal and metal alloys. The apparatus 10 receives a mold device, generally indicated at 12 that includes a first mold part or half, generally indicated at 14 and a second mold part or half, generally indicated at 16, operably connected with one another to define a cavity therebetween to receive at least one of polymeric, non-polymeric materials for forming parts. Alternatively, the apparatus 10 is also configured to perform stamping operations wherein blanks of at least one of metallic and organic materials (not shown) are placed between the first mold part 14 and the second mold part 16 thereby stamping parts (not shown). The apparatus 10 may also be used for compression and transfer molding operations as well without limiting the scope of the present invention.

The apparatus 10 of the present invention includes a housing or camera, generally indicated at 18, for engaging the mold device 12 wherein the first mold part 14 includes a top plate or platen 20 with a top mold 22 connected to and extending therefrom and a bottom plate or platen 24 with a bottom mold 26 connected to and extending therefrom. Each of the top 22 and bottom 26 molds includes a cavity 28 and 30 formed therein to adapt to the form of the part to be either stamped or molded. The top plate 20 presents side edges (only three edges are shown at 32, 34, and 36) with at least two of the side edges 32 presenting a plurality of male elements 40 or teeth extending therefrom in a cantilevered fashion.

A second set of male connectors 42 extends from the side edges 32 with the male connectors 42 being spaced from one another to define openings or cut out portions 44 therebetween. The male connectors 40 and 42 present a rectangular configuration. Those skilled in the art will appreciate that the configuration of the male connectors 40 and 42 as shown in Figures of the present invention is not intended to limit the scope of the present invention and other configurations can be used. The length and width between the male connectors 40 and 42 as illustrated in FIG. 1 is not intended to limit the scope of the present invention.

Alluding to the above, the top plate 20 and the top mold 22 are fabricated from metals and any other suitable materials as known to those skilled in mold manufacturing art. The bottom plate 24 includes a lip portion 46 extending from at least two sides (only one is shown at 48) of the bottom plate 24. Those skilled in the art will appreciate that the configuration of the lip portion 46 as shown in FIG. 1 of the present invention is not intended to limit the scope of the present invention and other configurations and length can be used. The length and width between the lip portion 46 as illustrated in FIG. 1 is not intended to limit the scope of the present invention.

The housing or camera 18 is used to support and keep therein the first and second mold parts 14 and 16. The housing 18 presents a box with a pair of doors 50 and 52 connected thereto thereby allowing access to the housing 18 for service and removal of the first and second mold parts 14 and 16. A base panel 54 is located on the bottom of the housing 18. The base panel 54 defines side rails 56 and 58 with grooves 62 and 64 in each of the side rails 58 and 56 to receive the lip portions 46 of the bottom plate 24 thereby securing the bottom plate 24 with the base panel 54. The lip portions 46 of the bottom plate 24 slide into the grooves 62 and 64 thereby allowing the bottom plate 24 to slide to and away from the grooves 62 and 64. The base panel 54 includes a plurality of inlet and outlet ports 68 and 70 for supplying fluids, polymeric and non polymeric materials into the bottom plate 24 for forming the parts and facilitating operational modes of the mold device 12. The base panel 54 includes a pair of notches 72 for aligning the bottom plate 24 with the base panel 54 and a plurality of rollers 74 to align the bottom plate 24.

As shown in FIGS. 3 through 6, the top portion 80 of the housing 18 presents a safety and locking device, generally indicated at 82 to secure and release, when replacement of the mold plates is required, of the top plate 20. The locking and safety device 82 presents several plates, i.e. a top slide, generally indicated at 84, a bottom slide, generally indicated at 86, and a center slide, generally indicated at 88, wherein each of the slides 84, 86, and 88 are selectively movable (slidable) relative to one another to secure the top plate 20. Each slide 84, 86, and 88 is further defined by a plate having a back edge 90 extending along the housing 18 and a front edge 92 with the plurality of male elements or extensions 96 extending from the front edge 92 and spaced by the voids 98.

As will be described herebelow, the center slide 88 is movable linearly (horizontally) relative the top slide 84 and the bottom slide 86 as the top slide 84 and the bottom slide 86 are positioned stationary relative to the movable center slide 88. Alternatively, based on configuration and dimensions of the housing 18, the top slide 84 and the bottom slide 86 may move relative the center slide 88 positioned stationary in the housing 18.

As best shown in FIGS. 5 and 6, the actuator 100 is connected with the housing 18. The actuator 100 can be positioned within the housing 18 or beyond the housing 18 without limiting the scope of the present invention. The actuator 100 can be mechanical, electrical, or any other type as known to those skilled in the actuator art without limiting the scope of the present invention. The shaft 102 extends from the actuator 100 and is connected to the center slide 88 to move the center slide 88 relative the top slide 84 and the bottom slide 86 to secure the top plate 20.

Figure 3:
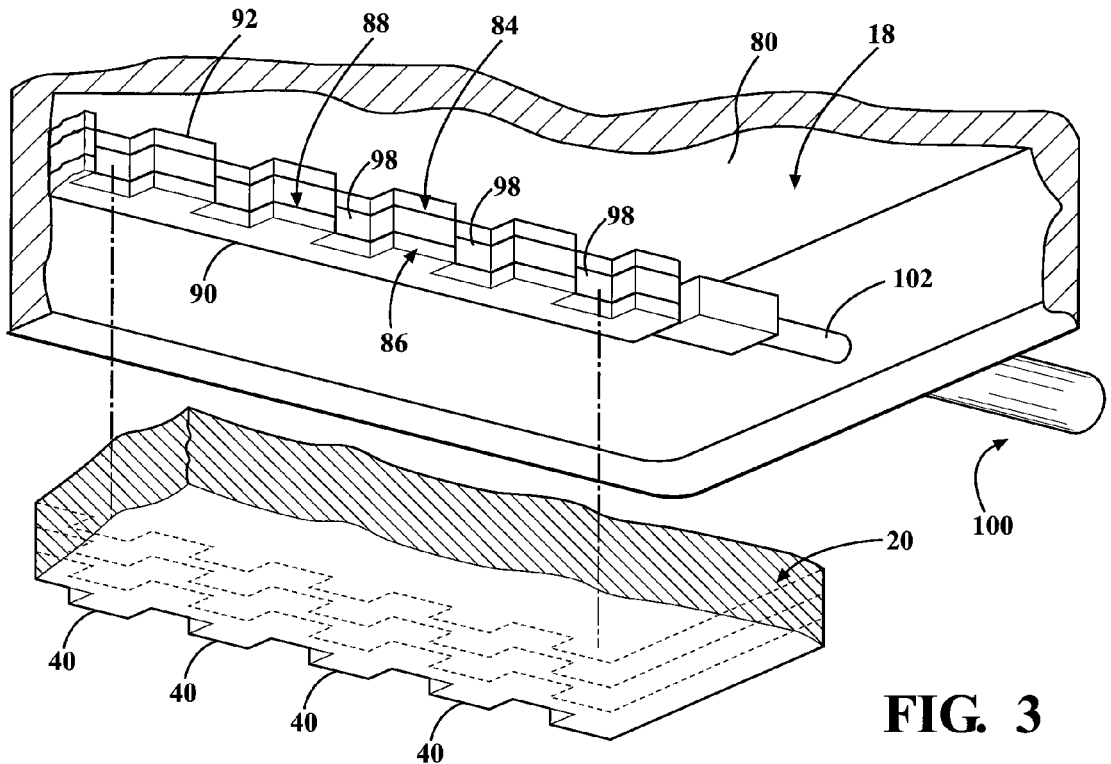
FIG. 3 illustrates partial cut out and exploded view of a top portion of the housing with a safety device connected thereto to engage the top plate, as partially shown herewith, with the safety device presenting three plates each presenting a plurality of teeth spaced from one another and the top plate presenting a side edge defined by a plurality of male elements or teeth for engaging with the teeth of the safety device.
Figure 4:
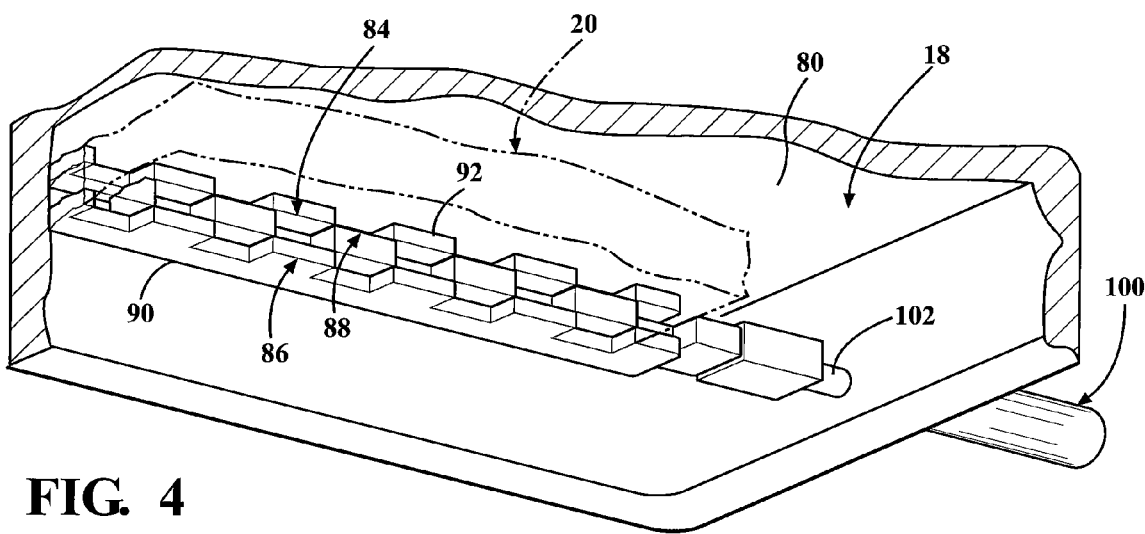
FIG. 4 illustrates another partial cut out view of the top portion of the housing with the safety device presented in activated mode wherein the plurality of male elements or teeth of the top plate are engaged by the teeth of the safety device thereby locking the top plate.
Figure 7:
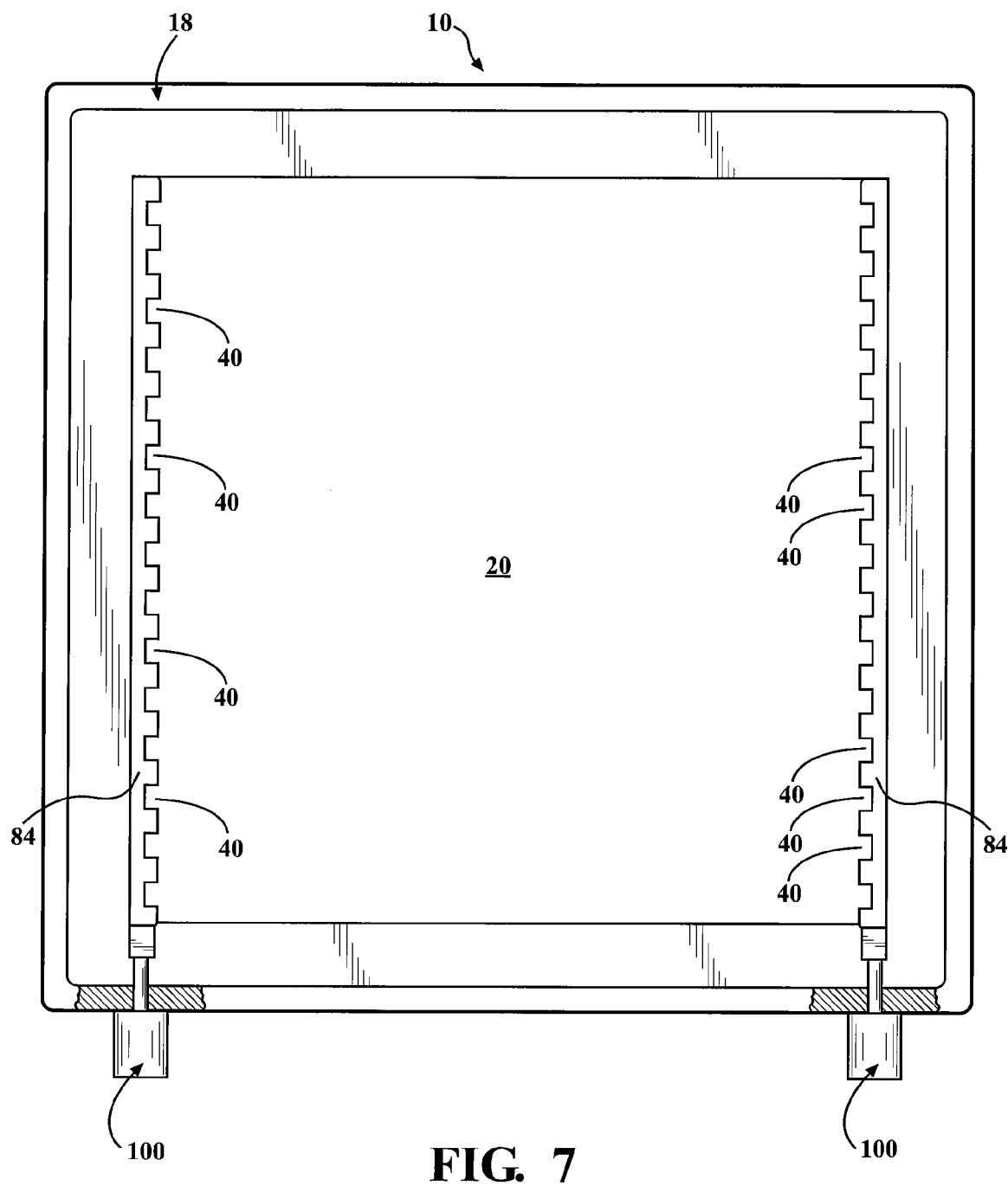
FIG. 7 illustrates a top view of the housing with the top plate engaged by the safety device.

A controller 104 is operably connected to the actuator 100 and a sensor 106 connected to the housing 18. The sensor 106 is used to sense any internal and external impacts to the housing 18 and within the housing 18 thereby signaling the controller 104 of any abnormal condition that may negatively impact operational modes of the mold device. The controller 104 signals the actuator in case of power outage from a power source 108 to ensure that the top plate 20 stays in a safe position is not drop to the bottom mold. The controller 104 regulates operational modes of the actuator 100 thereby allowing the actuator 100 to move the shaft 102 between the first position, as best illustrated in FIGS. 3 and 5, as the top plate 84, the bottom plate 86, and the center plate 88 are aligned with one another and the second position, as shown in FIGS. 4 and 6, wherein the shaft 102 moves the center plate 88 relative the top plate 84 and the bottom plate 86 thereby aligning the extensions of the center plate 88 with the voids of the top plate 84 and the bottom plate 86. The second position will remain the same in case if the controller 104 sends the signal to the actuator 100 to prevent movement of the shaft 102 from the second position to the first position in response to loss of power and external or internal impact on the housing 18 thereby preventing the top plate 20 from disengaging from the mold engaging device 82 and keeping the top plate 20 in the locked position by the mold engaging device 82.

As best shown in FIGS. 5 and 6, the plurality of male elements or extensions 96 extending from the front edge 92 are show by rectangular portions and the voids 98 are marked by inclined line patters to better distinguish the plurality of male elements or extensions 96 from the voids 98. As best shown in FIG. 6, as a shaft 102 is moved away from an actuator 100, as shown by an arrow 101, when the center slide 88 moves, the plurality of male elements or extensions 96 of the center slide 88 fill in the cut out portions 44 defined between the male connectors 40 and 42 of the top plate 20.

Alluding to the above, each of the male elements or extensions 96 will slide between the space defined between the male connectors 40 and 42. If the top plate 20 uses only one row of the male connectors 40 then the male elements or extensions 96 will slide to be positioned below the male connectors 40 of the top plate 20 thereby keeping the top plate 20 within the locking device 82 and preventing the top plate from dropping along down as shown by arrows at 103. In case power outage, the power source 108 will stop providing power to the actuator 100 and the controller 104 will send signal to the actuator 100 directing the actuator 100 to stay in the second position in order to prevent the actuator 100 from springing the shaft 102 back to its idle or the first position thereby locking the top plate 20 within the locking device 82. The locking and safety device 82 of the present invention provides for clamping of the upper mold 14 to the housing 18 and secure the upper mold 14 in place in case of power lose and any external or internal impacts on the housing 18 thereby preventing shutting or inadvertent drop of the upper mold 14 against the bottom mold 16 to eliminate any accident and injuries in a working environment during production process.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for forming parts from polymeric and non-polymeric materials, said apparatus comprising:
   a mold device having a first part and a second part with said first and second parts defining a cavity therebetween to form the part with said first part presenting side edges defining a plurality of male connectors extending therefrom;
   a housing adaptable to receive and support said mold device;
   an actuator cooperable with said housing; and
   a mold engaging device connected to said housing and operably communicated with said actuator and presenting two elements sliding relative to one another for engaging said first part of said mold device, said two elements presenting a plurality of extensions spaced from one another to define voids and moving between a first position as said two elements are aligned with one another to receive said male connectors extending between said extensions and a second position as one of said two elements is moved relative the other of said two elements and said first part of said mold device thereby supporting and locking said male connectors of said first part between said at least two elements and preventing said first part from disengaging from said mold engaging device in the event of power outage in said actuator thereby keeping said first part in a locked position by said mold engaging device.

2. An apparatus as set forth in claim 1, wherein said two elements are further defined by a top plate, a bottom plate, and a center plate each presenting a back edge extending along said housing and a front edge wherein said plurality of extensions present a rectangular configuration extending from said front edge and spaced by said voids.

3. An apparatus as set forth in claim 1, wherein said actuator includes a shaft connected to said center plate for moving said center plate relative said top plate and said bottom plate wherein said extensions of said center plate are aligned with said voids of said top plate and said bottom plate.

4. An apparatus as set forth in claim 1, wherein said actuator is a mechanical actuator.

5. An apparatus as set forth in claim 1, wherein said actuator is an electrical actuator.

6. An apparatus as set forth in claim 1, wherein said actuator is connected to a controller regulating operational modes of said actuator thereby allowing said actuator to move said shaft between said first position as said top plate, said bottom plate, and said center plate are aligned with one another and said second position wherein said shaft moves said center plate relative said top plate and said bottom plate thereby aligning said extensions of said center plate with said voids of said top plate and said bottom plate as said controller sends a signal to said actuator to prevent movement of said shaft from said second position to said first position in response to loss of power and external and internal impact on said apparatus thereby preventing said first part from disengaging from said mold engaging device and keeping said first part in the locked position by said mold engaging device.

7. An apparatus as set forth in claim 1, wherein said first part of said mold device is further defined by a top plate and a top mold extending from said top plate and presenting a first cavity for forming the part, said top plate presenting side edges defining said male connectors extending therefrom and a second set of male connectors extending from said side edges with said male connectors spaced from one another to define openings therebetween.

8. An apparatus as set forth in claim 1, wherein said second part of said mold device is further defined by a bottom plate and a bottom mold extending from said bottom plate and presenting a second cavity for forming the part, said bottom plate presenting side edges extending to lip portions.

9. An apparatus as set forth in claim 1, wherein said housing presents a box with a pair of doors allowing access to said housing and a base panel defining side rails with grooves in each of said side rails to receive said lip portions of said side edges of said bottom plate thereby securing said bottom plate with said base panel.

10. An apparatus as set forth in claim 1, wherein said base panel includes a plurality of inlet and outlet ports for supplying fluids, polymeric and non polymeric materials into said base plate for forming the part and facilitating operational modes of said mold device.

11. An apparatus as set forth in claim 1, wherein said base panel includes a pair of notches for aligning said bottom plate with said bottom panel and a plurality of rollers to align said bottom plate.

12. An apparatus for forming parts from polymeric and non-polymeric materials, said apparatus comprising:
a mold device having a top plate and a top mold extending from said top plate and presenting a first cavity for forming the part, said top plate presenting side edges defining said male connectors extending therefrom and a bottom plate and a bottom mold extending from said bottom plate and presenting a second cavity for forming the part, said bottom plate presenting side edges extending to lip portions;
a housing adaptable to receive and support said mold device;
an actuator having a shaft;
a mold engaging device connected to said housing and operably communicated with said actuator through said shaft and presenting two elements sliding relative to one another for engaging said first part of said mold device and having a plurality of extensions spaced from one another to define voids; and
a controller operably connected to said actuator to send signals to said actuator for moving said two elements between a first position as said two elements are aligned with one another to receive said male connectors extending between said extensions and a second position as one of said two elements is moved relative the other of said two elements and said top plate of said mold device to support and lock said male connectors of said top plate between said two elements thereby preventing said top plate from disengaging from said mold engaging device in the event of power loss in said actuator thereby keeping said top plate in a locked position by said mold engaging device.

13. An apparatus as set forth in claim 12, wherein said two elements are further defined by a top plate, a bottom plate, and a center plate each presenting a back edge extending along said housing and a front edge wherein said plurality of extensions present a rectangular configuration extending from said front edge and spaced by said voids.

14. An apparatus as set forth in claim 12, wherein said shaft is connected to said center plate for moving said center plate relative said top plate and said bottom plate wherein said extensions of said center plate are aligned with said voids of said top plate and said bottom plate.

15. An apparatus as set forth in claim 12, wherein said actuator is a mechanical actuator.

16. An apparatus as set forth in claim 12, wherein said actuator is an electrical actuator.

17. An apparatus as set forth in claim 12, wherein said controller regulates operational modes of said actuator thereby allowing said actuator to move said shaft between said first position as said top plate, said bottom plate, and said center plate are aligned with one another and said second position wherein said shaft moves said center plate relative said top plate and said bottom plate thereby aligning said extensions of said center plate with said voids of said top plate and said bottom plate wherein said controller sends the signal to said actuator to prevent movement of said shaft from said second position to said first position in response to at least one of power loss, external, and internal impact on said apparatus thereby preventing said first part from disengaging from said mold engaging device and keeping said first part in the locked position by said mold engaging device.

18. A safety and clamping device for an apparatus adaptable for forming parts from polymeric and non-polymeric materials and having a housing, a mold device with a first part and a second part defining a cavity therebetween to form the part, said safety and clamping device comprising;
an actuator cooperable with the housing; and
a mold engaging device connected to the housing and operably communicated with said actuator, said mold engaging device presenting two elements sliding relative to one another for engaging the first part and presenting a plurality of extensions spaced from one another to define voids, said two elements movable between a first position as said two elements are aligned with one another to receive the first part extending between said extensions and a second position as one of said two elements is moved relative the other of said two elements and the first part thereby supporting and locking the first part between said two elements and preventing the first part from disengaging from said mold engaging device in the event of power loss supplied to said actuator thereby keeping the first part in a locked position by said mold engaging device.

19. A safety and clamping device as set forth in claim 18, wherein said two elements are further defined by a top plate, a bottom plate, and a center plate each presenting a back edge extending along said housing and a front edge wherein said plurality of extensions present a rectangular configuration extending from said front edge and spaced by said voids.

20. A safety and clamping device as set forth in claim 18, wherein said actuator includes a shaft connected to said center plate for moving said center plate relative said top plate and said bottom plate wherein said extensions of said center plate are aligned with said voids of said top plate and said bottom plate.

21. A safety and clamping device as set forth in claim 18, wherein said actuator is connected to a controller regulating operational modes of said actuator thereby allowing said actuator to move said shaft between said first position as said top plate, said bottom plate, and said center plate are aligned with one another and said second position wherein said shaft moves said center plate relative said top plate and said bottom plate thereby aligning said extensions of said center plate with said voids of said top plate and said bottom plate wherein said controller sends a signal to said actuator to prevent movement of said shaft from said second position to said first position in response to power loss and external or internal impact on the apparatus thereby preventing said first part from disengaging from said mold engaging device and keeping said first part in the locked position by said mold engaging device.

22. A safety and clamping device as set forth in claim 18, wherein the first part of the mold device is further defined by a top plate and a top mold extending from the top plate and presenting a first cavity for forming the part, the top plate presenting the edges defining the male connectors extending therefrom and a second set of male connectors extending from the side edges with the male connectors spaced from one another to define openings therebetween and wherein the second part is further defined by a bottom plate and a bottom mold extending from the bottom plate and presenting a second cavity for forming the part, the bottom plate presenting side edges extending to lip portions.

23. A safety and clamping device as set forth in claim 18, wherein the housing presents a box with a pair of doors allowing access to the housing and a base panel defining side rails with grooves in each of the side rails to receive lip portions of the side edges of the bottom plate thereby securing the bottom plate with the base panel, the base panel including a plurality of inlet and outlet ports for supplying fluids, polymeric and non polymeric materials into the bottom plate for forming the part and facilitating operational modes of the mold device.

24. A safety and clamping device as set forth in claim 18, wherein the base panel includes a pair of notches for aligning the bottom plate with the base panel and a plurality of rollers to align the bottom plate.

25. A safety and clamping device as set forth in claim 18, wherein the apparatus is an injection molding apparatus.

26. A safety and clamping device as set forth in claim 18, wherein the apparatus is a stamping apparatus.

27. A safety and clamping device as set forth in claim 18, wherein the apparatus is a compression molding apparatus.

28. A safety and clamping device as set forth in claim 18, wherein the apparatus is a transfer molding apparatus.

29. A method for clamping a mold device in an apparatus for forming parts from polymeric and non-polymeric materials, said method comprising the steps of:
   placing a mold device in a housing with the mold device having a first part and a second part defining a cavity therebetween to form the part with the first part presenting side edges defining a plurality of male connectors extending therefrom;
   positioning a mold engaging device including at least two elements presenting a plurality of extensions spaced from one another to define voids and movable relative to one another for engaging the first part of the mold device;
   connecting an actuator to the mold engaging device to move one of the two elements relative one another; and
   moving the two elements between a first position by aligning the two elements with one another to receive the male connectors of the first part extending between the extensions of the two elements and a second position as one of the two elements is moved relative to the other of the two elements and the first part of the mold device to support and lock the male connectors of the first part between the two elements thereby preventing the first part from disengaging from the mold engaging device in the event of power loss in the actuator to keep the first part in a locked position by the mold engaging device.

30. A method as set forth in claim 29, wherein the step of positioning a mold engaging device is further defined by connecting three plates each having a back edge and a front edge with the plurality of extensions presenting a rectangular configuration extending from the front edge and spaced by the voids.

31. A method as set forth in claim 29, wherein the step of connecting three plates is further defined by connecting a top plate, a bottom plate, and a center plate.

32. A method as set forth in claim 29, wherein the step of connecting an actuator is further defined by connecting to the actuator a shaft extending to and connected to the center plate to move the center plate relative the top plate and the bottom plate wherein the extensions of the center plate are aligned with the voids of the top plate and the bottom plate.

33. A method as set forth in claim 29, including the step of connecting a controller to the actuator to regulate operational modes of the actuator thereby allowing the actuator to move the shaft between the first position as the top plate, the bottom plate, and the center plate are aligned with one another and the second position wherein the shaft moves the center plate relative the top plate and the bottom plate thereby aligning the extensions of the center plate with the voids of the top plate and the bottom plate as the controller sends signal to the actuator to prevent movement of the shaft from the second position to the first position in response to loss of power and at least one of external and internal impact on the housing to prevent the first part from disengaging from the mold engaging device and to keep the first part in the locked position by the mold engaging device.

34. A method as set forth in claim 29, including the step of forming the first part of the mold device to have a top plate and a top mold extending from the top plate with the side edges defining the male connectors extending therefrom and presenting a first cavity for forming the part.

35. A method as set forth in claim 29, including the step of forming the second part of the mold device to include a bottom plate and a bottom mold extending from said bottom plate and presenting a second cavity for forming the part with the bottom plate presenting side edges extending to lip portions.

\* \* \* \* \*